(12) United States Patent
Ghodrati et al.

(10) Patent No.: US 11,339,904 B2
(45) Date of Patent: May 24, 2022

(54) MAGNETIC HOSE COUPLING FOR HELMET FORCED AIR HOSE

(71) Applicant: Bell Sports, Inc., Scotts Valley, CA (US)

(72) Inventors: Arvand Ghodrati, Walnut Creek, CA (US); William A. Hilgenberg, Ben Lomond, CA (US); Allen A. Bischofberger, Ben Lomond, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 693 days.

(21) Appl. No.: 16/166,051

(22) Filed: Oct. 19, 2018

(65) Prior Publication Data
US 2020/0124217 A1    Apr. 23, 2020

(51) Int. Cl.
*F16L 21/06* (2006.01)
*F16L 37/00* (2006.01)
*F16L 15/00* (2006.01)

(52) U.S. Cl.
CPC ........ *F16L 37/004* (2013.01); *F16L 15/006* (2013.01); *F16L 21/06* (2013.01)

(58) Field of Classification Search
CPC ....... F16L 37/004; F16L 37/006; F16L 21/06; A42B 3/328; A42B 3/228; A42B 3/281
See application file for complete search history.

(56) References Cited

U.S. PATENT DOCUMENTS

| | | | |
|---|---|---|---|
| 2,793,057 A * | 5/1957 | Mcgugin | F16L 37/004 285/9.1 |
| 3,181,895 A * | 5/1965 | Cator | F16L 37/004 285/1 |
| 10,502,351 B2 | 12/2019 | Jaeger et al. | |
| 11,137,098 B2 | 10/2021 | Jaeger et al. | |
| 2010/0307497 A1 | 12/2010 | Busch et al. | |
| 2011/0084474 A1 | 4/2011 | Paden et al. | |
| 2012/0319313 A1* | 12/2012 | Davis | B65D 43/0202 261/119.1 |
| 2018/0035787 A1 | 2/2018 | Jaeger et al. | |
| 2018/0035788 A1 | 2/2018 | Jaeger et al. | |
| 2018/0035789 A1 | 2/2018 | Jaeger et al. | |

(Continued)

OTHER PUBLICATIONS

Extended European Search Report cited in corresponding European Application No. 19203713.3 dated Mar. 3, 2020.

*Primary Examiner* — Matthew Troutman
*Assistant Examiner* — James A Linford
(74) *Attorney, Agent, or Firm* — Gerard M. Donovan; Walter M. Egbert, III; Reed Smith LLP

(57) ABSTRACT

A magnetic hose coupling system for a helmet includes first and second coupling conduit segments magnetically coupled to each other. The first segment includes a hinged clamp at a first end to attach to a forced air intake barb on a motorsport helmet and an angled polygonal mating surface at a second end with magnetic attractors in the polygonal mating surface. The second segment includes an internally threaded first end to attach to a forced air hose and an angled polygonal mating surface at a second end with magnetic attractors in the polygonal mating surface. The polygonal mating surfaces of the first and second segments magnetically couple together and resist rotational and sheer movement of the first and second segments with respect to each other.

20 Claims, 13 Drawing Sheets

(56) References Cited

U.S. PATENT DOCUMENTS

| | | |
|---|---|---|
| 2018/0035790 A1 | 2/2018 | Jaeger et al. |
| 2018/0035791 A1 | 2/2018 | Jaeger et al. |
| 2018/0038534 A1 | 2/2018 | Jaeger et al. |
| 2018/0192724 A1* | 7/2018 | Jaeger ............... A42B 1/24 |
| 2018/0195654 A1 | 7/2018 | Jaeger et al. |
| 2019/0090579 A1* | 3/2019 | Hernandez Torres . A42B 3/283 |

* cited by examiner

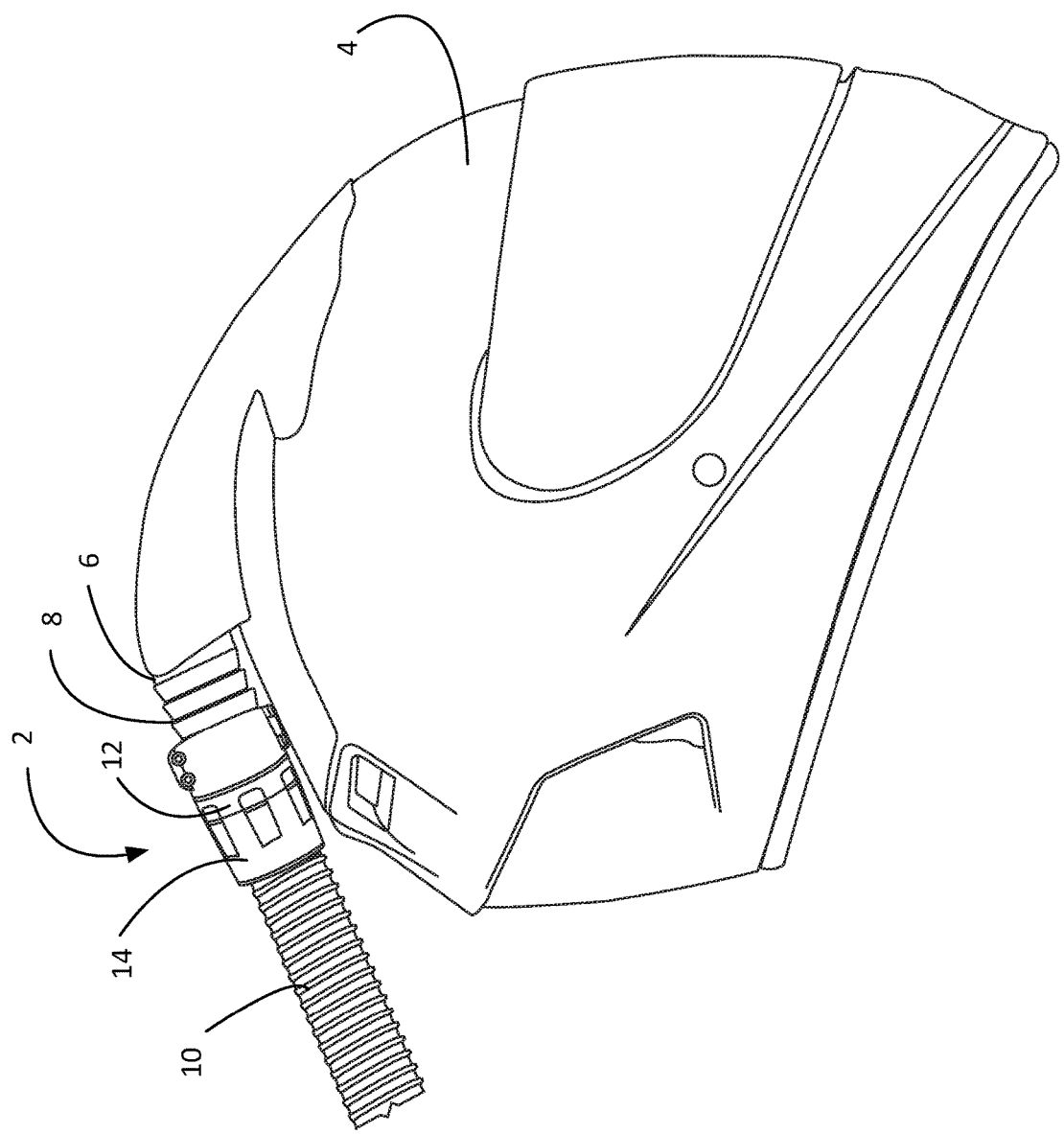

MAGNETIC HOSE COUPLING FOR HELMET FORCED AIR HOSE

TECHNICAL FIELD

Aspects of this document relate generally to helmets with a forced air intake hose, and more specifically to a magnetic connector for a motorcycle or cycling helmet with a forced air hose attached.

BACKGROUND

Protective headgear is used in motorsports to reduce the severity of participant head injuries. In some motorsport activities, the environment is extreme and may be dirty or dusty. In dirty or dusty environments, participants wearing helmets often desire fresh air to be pumped into their helmets to make it easier to breathe during participation in the sport. For example, pump or air tank with a forced air hose that extends to the participant's helmet may provide fresh air to the helmet through a barb on the helmet.

Conventionally, the forced air hose is attached to the barb on the helmet by stretching the hose over the barb so that the forced air is injected into the helmet. However, once the forced air hose is stretched over the helmet barb, it is stretched and future attachments require another component, such as a zip tie or duct tape, to securely fasten the hose to the barb. However, for safety reasons, to enable the participant to quickly escape the vehicle in an accident, the forced air hose needs to be removable from the barb, which can often be slow when the hose is attached to the barb with a zip tie or tape.

SUMMARY

According to one aspect, a magnetic hose coupling system for a helmet may comprise a first coupling conduit segment configured to magnetically couple to a second coupling conduit segment, the first coupling conduit segment having a first end comprising a hinged clamp having a body, and a clasp hingedly coupled to the body, the first end comprising an internal ridge sized and adapted to receive and engage with a groove on a forced air intake barb on a motorsport helmet when the first end is coupled to the motorsport helmet, the hinged clamp proximate the first end, and a second end, distal to the first end, the second end comprising a leading edge extending between inner and outer walls of the first coupling conduit segment, the leading edge comprising a first hexagonal mating surface and an annular ring extending inward at the leading edge from the outer wall, the leading edge further comprising a magnetic attractor at a surface of the first hexagonal mating surface on each of six sides of the first hexagonal mating surface, and the second coupling conduit segment having a first end internally threaded and adapted to connect to a forced air hose, and a second end, distal to the first end, the second end comprising a leading edge extending between inner and outer walls of the second coupling conduit segment, the leading edge comprising an annular ring extending inward at the leading edge from the outer wall, the leading edge further comprising a second hexagonal mating surface comprising a magnetic attractor at a surface of the second hexagonal mating surface on each of six sides of the second hexagonal mating surface, the second hexagonal mating surface angled to mate with the first hexagonal mating surface of the first coupling conduit segment, and a longitudinal axis centered in both the second end of the first coupling conduit segment and the second end of the second coupling conduit segment, wherein the magnetic attractors of at least one of the first hexagonal mating surface and the second hexagonal mating surface comprise magnets flush with the respective hexagonal mating surface at which it exists, the first hexagonal mating surface and the second hexagonal mating surface forming an angle with the longitudinal axis that is less than 80 degrees.

Particular embodiments may comprise one or more of the following features. The angle may be less than 70 degrees. The angle may be 60 degrees or less. The magnetic attractors may be each planar facets of the respective hexagonal mating surface at which it exists. A motorsport helmet with a forced air intake barb having at least one groove on an outer surface of the intake barb, wherein the at least one groove is seated against the internal ridge of the first end of the first coupling conduit segment. A seal ring positioned on the leading edge of either the first coupling conduit segment or the second conduit coupling segment that is positioned between the first coupling conduit segment and the second coupling conduit segment when the first hexagonal mating surface is mated with the first hexagonal mating surface. At least a portion of one of the first and second hexagonal mating surfaces may be inside of the other of the first and second hexagonal mating surfaces when the first coupling conduit segment may be magnetically coupled to the second coupling conduit segment. The magnetic attractors for both the first and second hexagonal mating surfaces may be magnets.

According to an aspect, a magnetic hose coupling system for a helmet may comprise a first coupling conduit segment configured to magnetically couple to a second coupling conduit segment, the first coupling conduit segment having a first end adapted to receive a forced air intake barb on a motorsport helmet when the first end is coupled to the motorsport helmet, and a second end, distal to the first end, the second end comprising a leading edge between inner and outer walls of the first coupling conduit segment, the leading edge comprising a first polygonal mating surface and a first plurality of magnetic attractors each on different planar facets of the first polygonal mating surface, and the second coupling conduit segment having a first end adapted to connect to a forced air hose, and a second end, distal to the first end, the second end comprising a leading edge between inner and outer walls of the second coupling conduit segment, the leading edge comprising a second polygonal mating surface a second plurality of magnetic attractors each on different planar facets of the second polygonal mating surface, the second plurality of magnetic attractors positioned to align with the first plurality of magnetic attractors first polygonal mating surface, and a longitudinal axis centered in both the second end of the first coupling conduit segment and the second end of the second coupling conduit segment, wherein at least a portion of the plurality of magnetic attractors of at least one of the first polygonal mating surface and the second polygonal mating surface comprise magnets, the first polygonal mating surface and the second polygonal mating surface forming an angle with the longitudinal axis that is 80 degrees or less.

Particular embodiments may comprise one or more of the following features. The first end of the first coupling conduit segment may further comprise a clamp hingedly coupled to the first coupling conduit segment, the clamp movable between an open position in which the first coupling conduit segment is open and sized to receive the air intake barb of the helmet, and a closed position in which the first coupling conduit segment is closed. The leading edge of each of the first and second coupling conduit segments may further comprise an annular ring positioned to mate with each other when the first polygonal mating surface and the second polygonal mating surface are mated. An annular seal positioned between the leading edges of the first and second coupling conduit segments when the first polygonal mating surface and the second polygonal mating surface are mated. The first end of the second coupling conduit segment may be internally threaded. Each of the first and second polygonal mating surfaces may comprise at least five planar facets. Each of the first and second polygonal mating surfaces may comprise at least six planar facets. The angle may be 70 degrees or less. The angle may be 60 degrees or less. A motorsport helmet with a forced air intake barb having at least one groove on an outer surface of the intake barb, wherein the at least one groove is seated against an internal notch of the first end of the first coupling conduit segment. At least a portion of one of the first and second polygonal mating surfaces may be inside of the other of the first and second polygonal mating surfaces when the first coupling conduit segment is magnetically coupled to the second coupling conduit segment. The magnetic attractors for both the first and second polygonal mating surfaces may be magnets.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 1A is a side exploded view of a motorsports helmet coupled to a forced air hose;

DETAILED DESCRIPTION

Figure 1B:
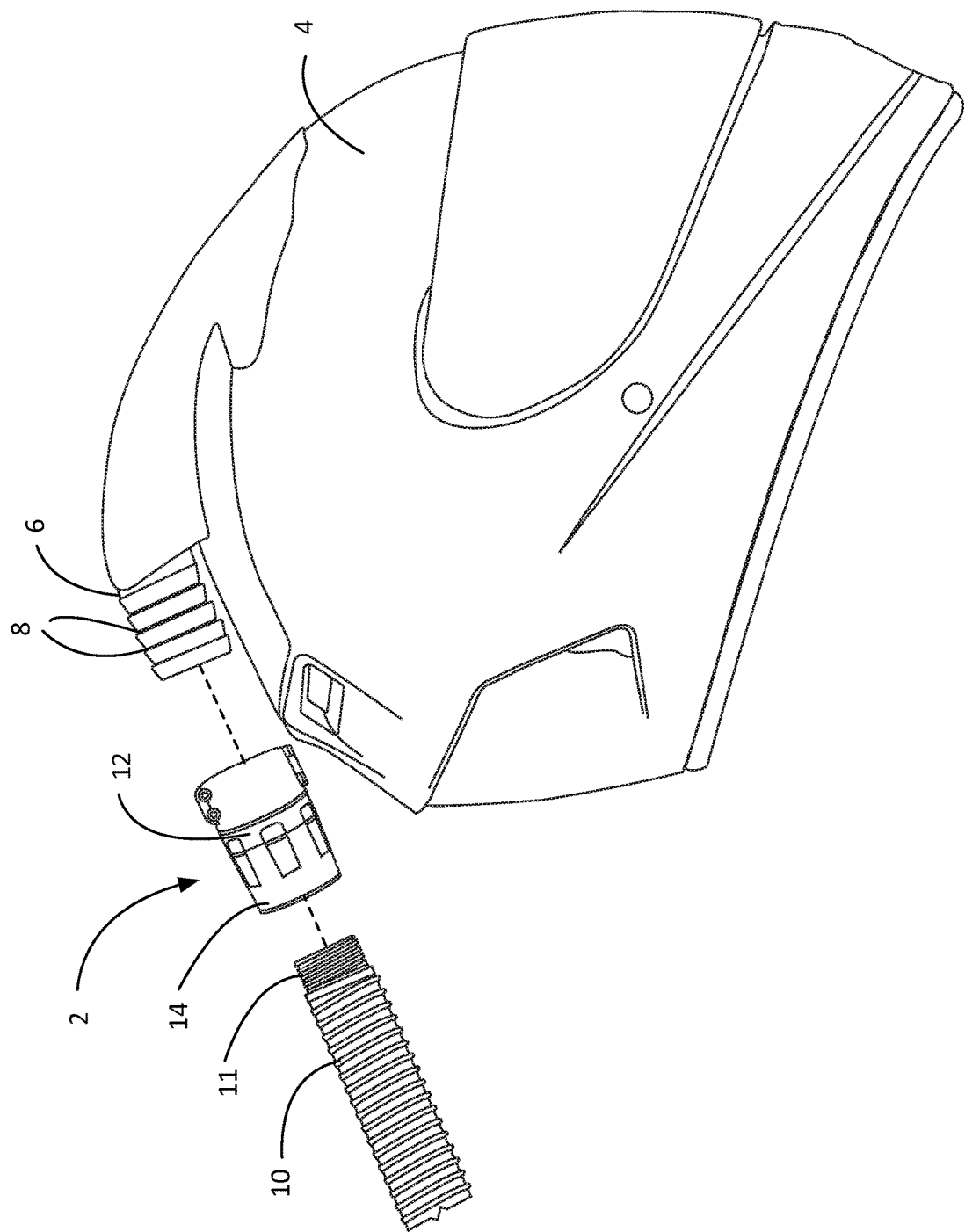
FIG. 1B is a side connected view of a motorsports helmet coupled to a forced air hose.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

With reference to FIGS. 1A and 1B, a magnetic hose coupling system includes a magnetic coupling conduit 2, a helmet 4 with a forced air intake barb 6 that includes one or more grooves 8 on the barb and a forced air hose 10. The magnetic coupling conduit 2 comprises a first, hose-end coupling conduit segment 12 and a second, barb-end coupling conduit segment 14. The forced air hose 10 is coupled to an air pump or tank configured to provide air into the helmet 4 through the magnetic coupling conduit 2.

Conventional forced air hose connectors for a helmet couple the hose to the helmet directly by placing the end of the hose over the forced air intake barb. This type of connection is inconsistently and unduly difficult to remove from the helmet, or does not hold the hose on the barb reliably enough. To make the attachment secure, a ring or zip tie is placed over the end of the hose to secure it to the barb, which increases the difficulty in removing the hose in an emergency. Without something to more securely attach the end of the hose to the barb, the hose tends to fall off through movement of the wearer's head and body while the wearer is wearing the helmet.

Figure 2A:
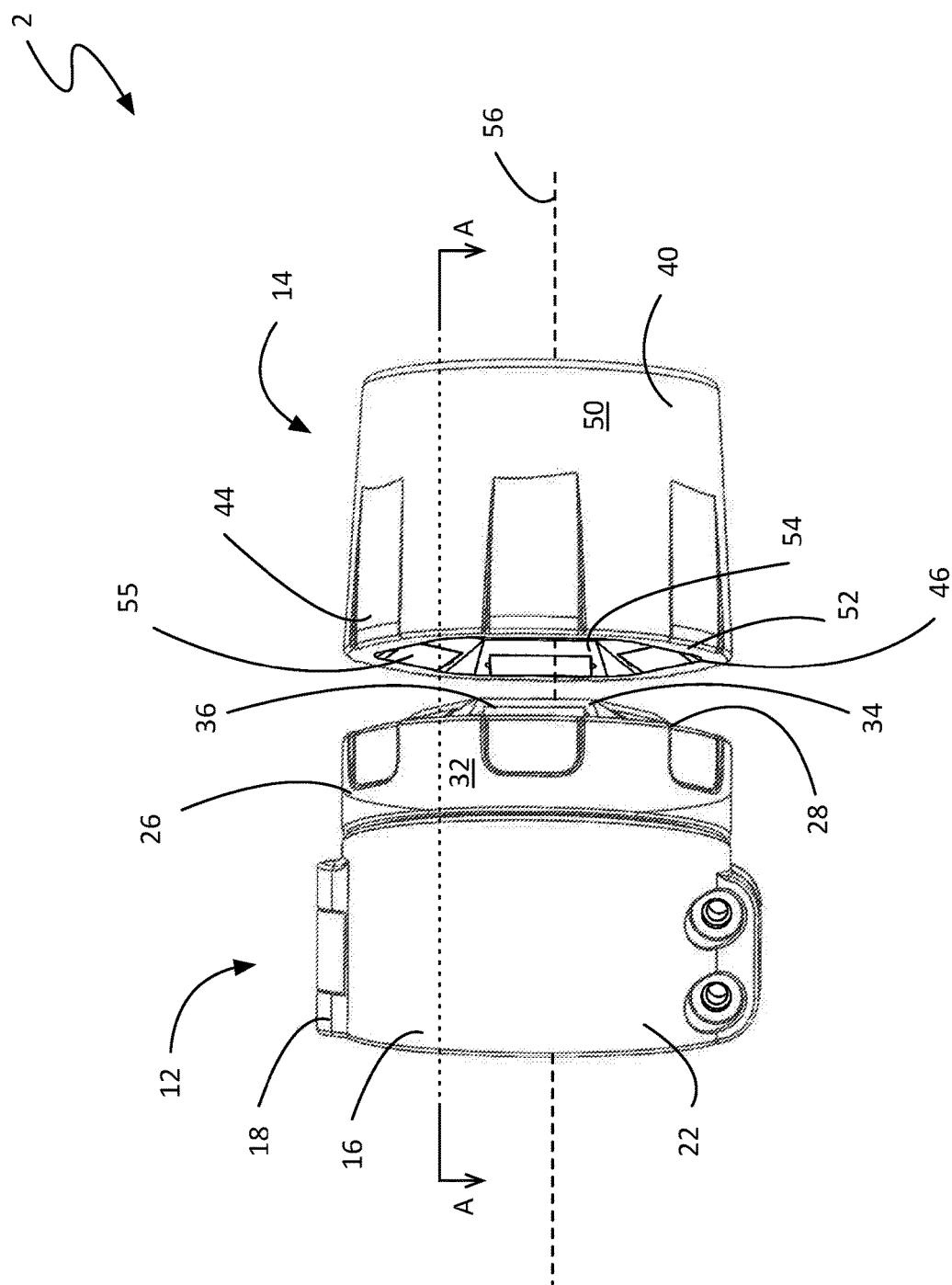
FIG. 2A is a top view of an uncoupled magnetic hose coupling.
Figure 2B:
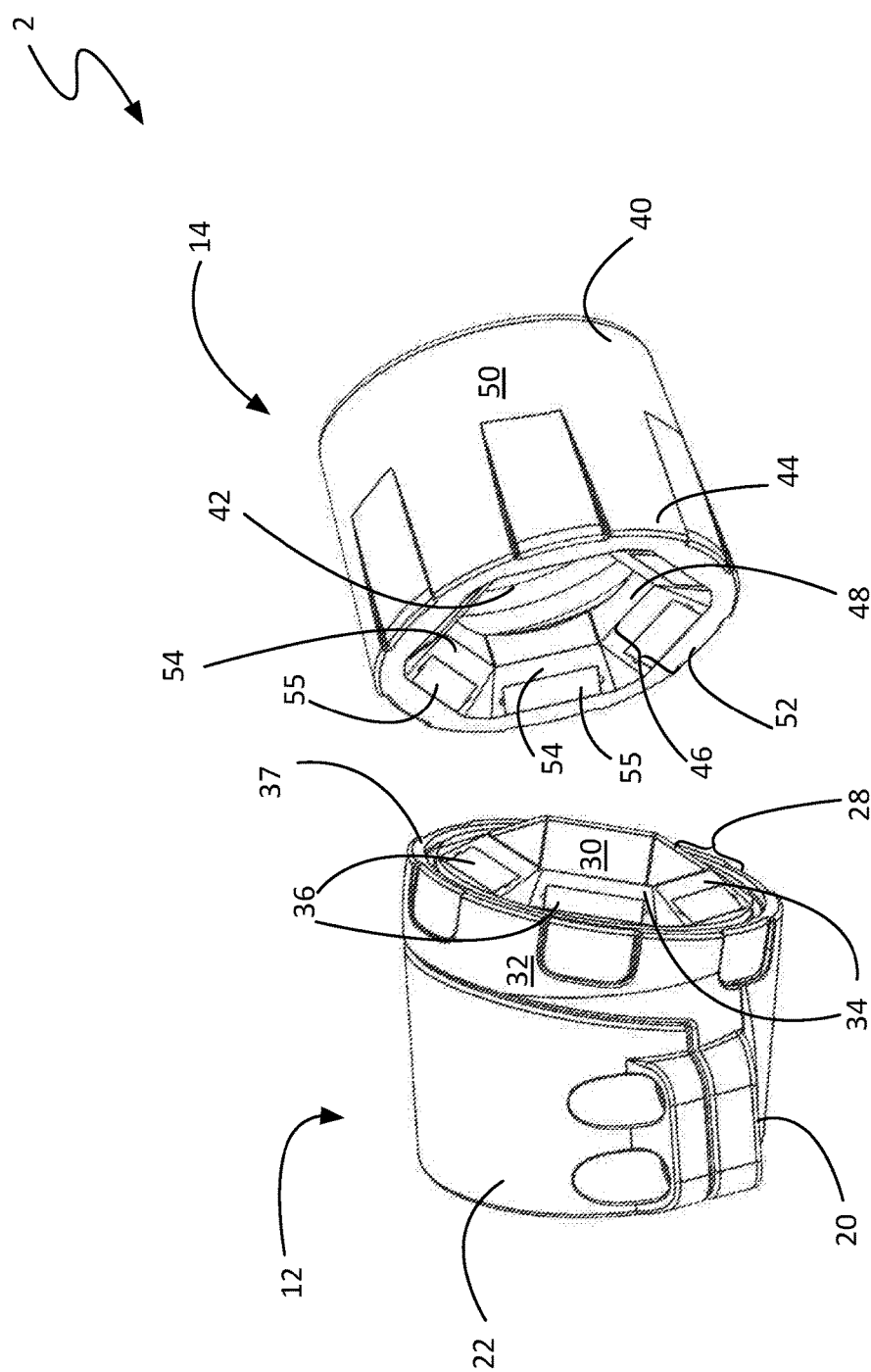
FIG. 2B is a top view of the uncoupled magnetic hose coupling of FIG. 2A with the first and second coupling sides separated.
Figure 3:
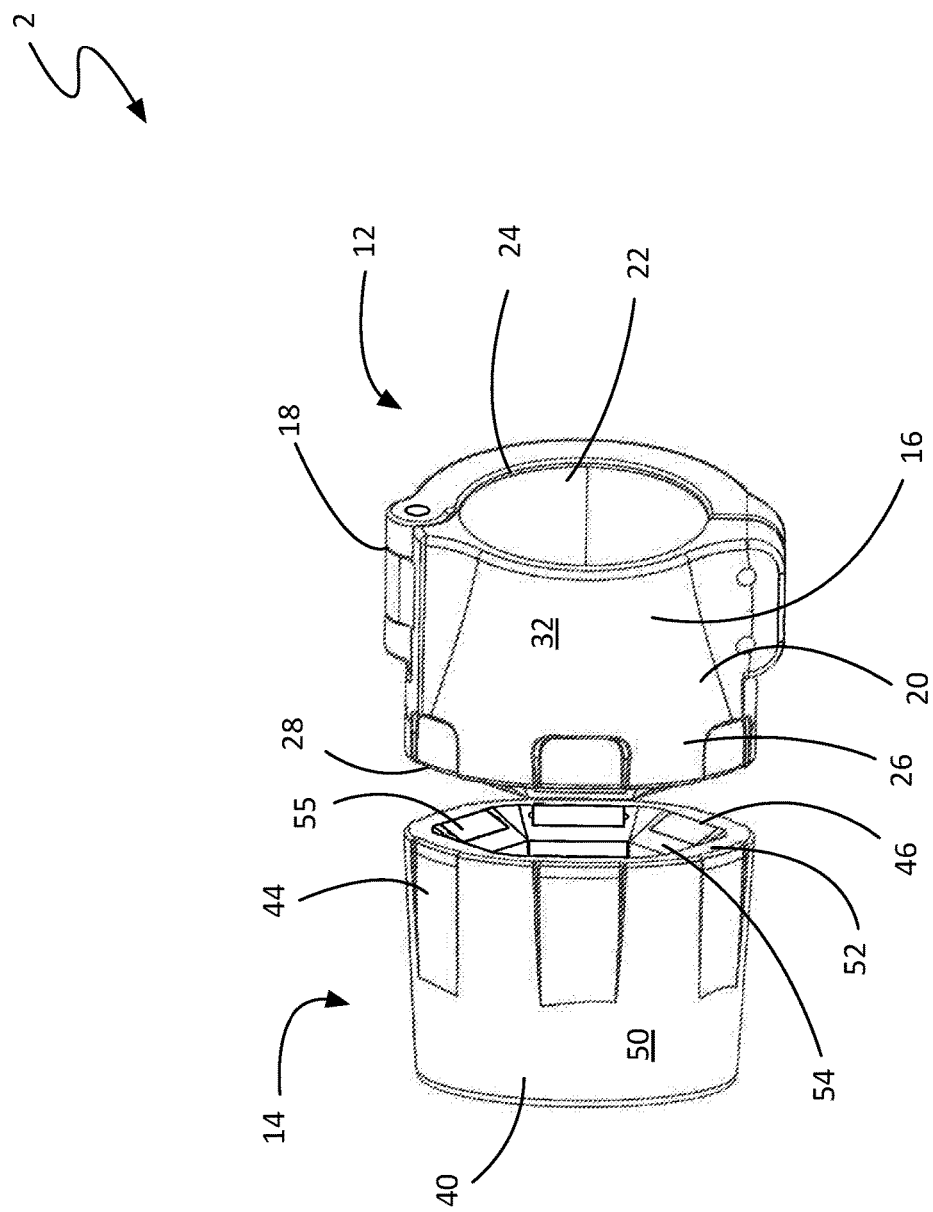
FIG. 3 is a bottom view of the uncoupled magnetic hose coupling of FIG. 2A.
Figure 4A:
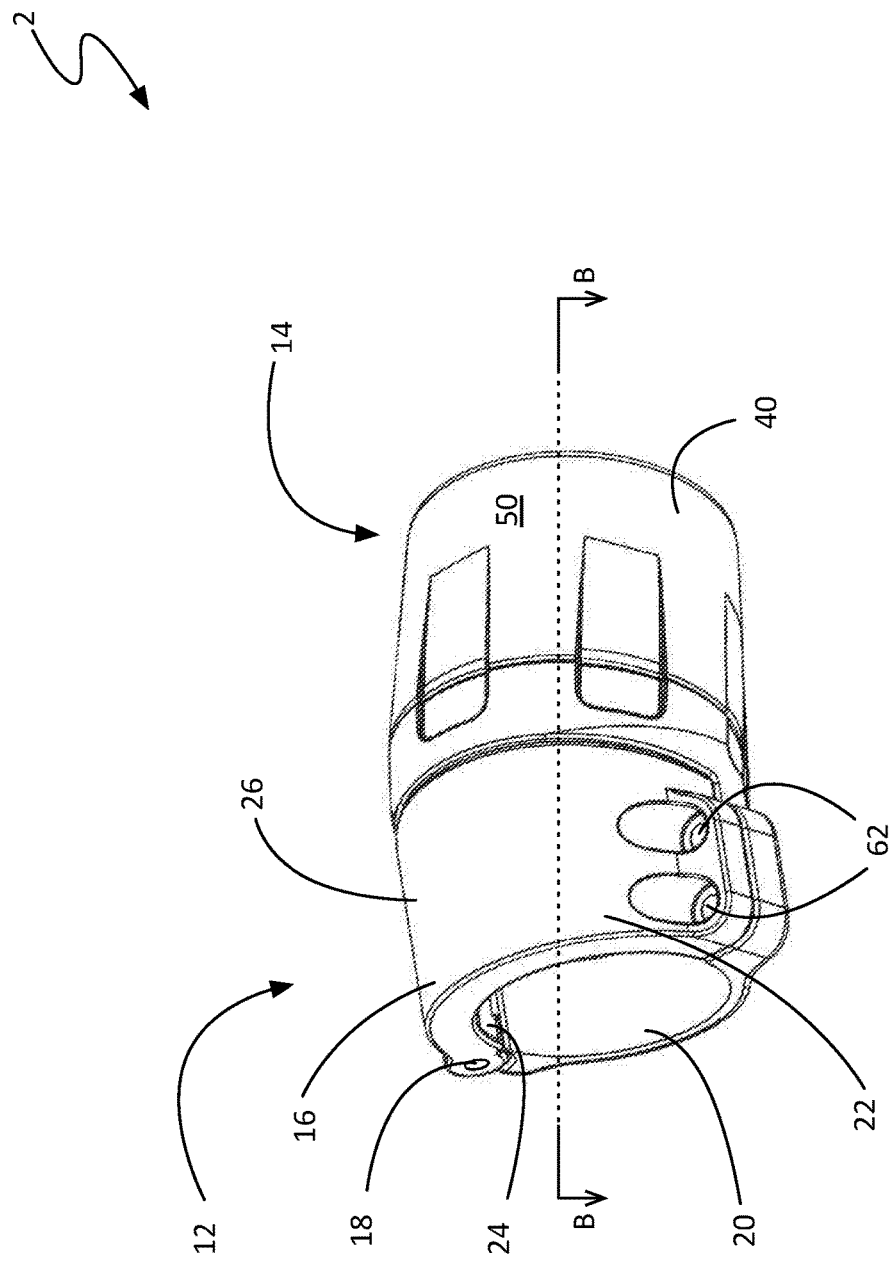
FIG. 4A is a perspective top view of a coupled magnetic hose coupling with the hose coupling side closed.
Figure 4B:
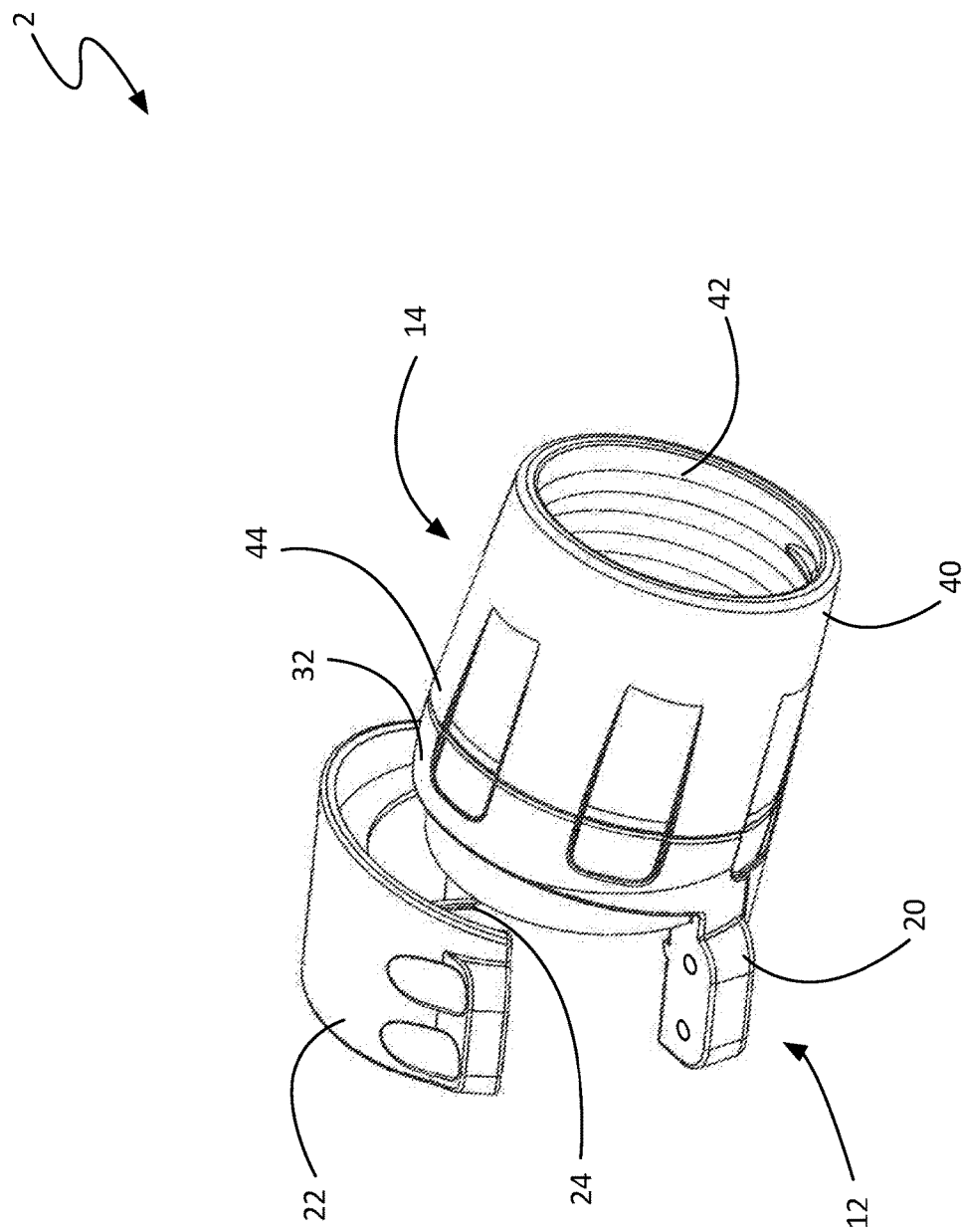
FIG. 4B is a perspective side view of the coupled magnetic hose coupling of FIG. 4A with the hose coupling side open.
Figure 4C:
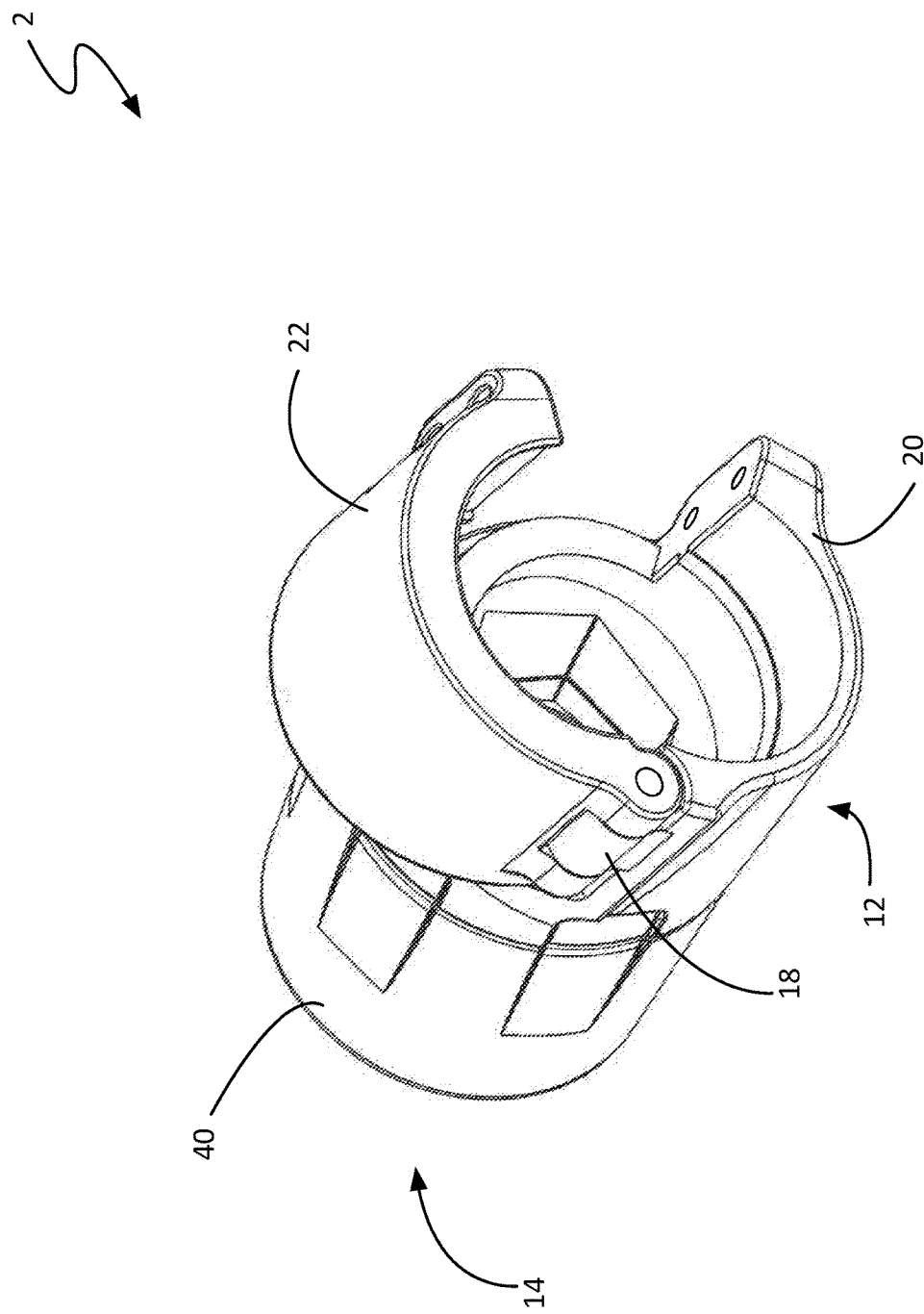
FIG. 4C is a perspective first end view of the magnetic hose coupling of FIG. 4A with the hose coupling side open.
Figure 4D:
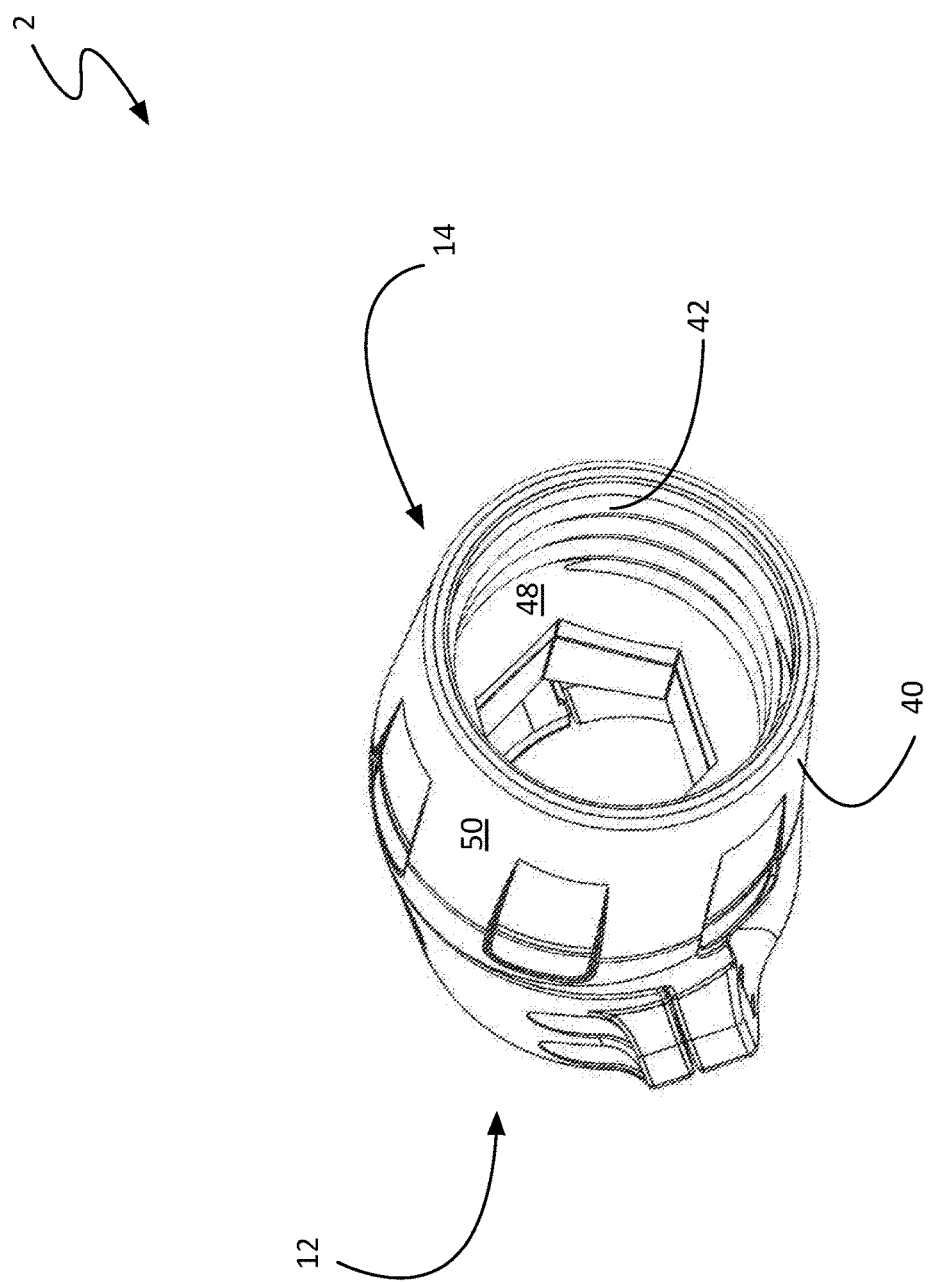
FIG. 4D is a perspective second end view of the magnetic hose coupling of FIG. 4A.

The magnetic coupling conduit 2 embodiments shown and described herein provide a consistent attachment mechanism that both securely holds the connection between the hose 10 and the barb 6 and helmet 4, and is removable through intentional action to remove the hose 10 from the barb 6 and helmet 4 in an emergency. With reference to the embodiments shown and described in FIGS. 2A-7, an improved magnetic coupling conduit 2 includes a first coupling conduit segment 12 and a second coupling conduit segment 14, configured to magnetically couple together. The first, or hose-end, coupling conduit segment 12 includes a body 20 and a clasp 22 hingedly coupled together through a hinge 18 that enables the clasp 22 to adjust the first coupling conduit segment 12 between an open position (FIGS. 4B-4C) and a closed position (FIGS. 1A, 2B and 5B, for example). With the first coupling conduit segment 12 in the open position, first coupling conduit segment 12 can be placed by a user around the barb 6 of the helmet 4 and moved to the closed position so that at least one internal ridge 24 or groove on the first coupling conduit segment 12 engages at least one groove 8 on the barb 6. The clasp 22 can be secured to the body 20 through a mechanical latch or other fasteners 62 (FIG. 4A). The clasp 22 is closest the first end 16 of the first coupling conduit segment 12.

The second end 26 of the first coupling conduit segment 12 includes an inner wall or surface 30 (FIGS. 2B, 7) and an outer wall or surface 32 (FIGS. 2A-2B), with a leading edge 28 (FIGS. 2B, 5B and 7) extending between them. The leading edge 28 comprises a first angled mating surface 34, and may comprise an annular ring 37 extending around the first angled mating surface 34. The first angled mating surface 34 is positioned at an angle 58 (FIG. 6) of 80 degrees or less in relation to the longitudinal axis 56 of the first coupling conduit segment 12 at the second end 26. In particular embodiments, the angle. 58 of the first angled mating surface 34 in relation to the longitudinal axis 56 is 70 degrees or less, and in still other embodiments, the angle 58 is 60 degrees or less. In still other embodiments, the angle 58 is between 30 and 80 degrees relative to the longitudinal axis 56. In one particular embodiment, the angle 58 is between 15 and 80 degrees relative to the longitudinal axis 56.

The first angled mating surface 34 is a polygonal shape comprising a plurality of planar facets; or in other words, a first polygonal mating surface 34. The number of planar facets of the polygonal shape of the first angled mating surface 34 depends upon the shape used. For example, the shape may be a triangular shape with three facets, a square shape with four facets, a pentagonal shape with five facets, a hexagonal shape with six facets, a septagonal shape with seven facets, an octagonal shape with eight facets, or any other number of facets. In the embodiment shown in FIG. 2B, the first polygonal mating surface 54 comprises a first hexagonal mating surface because it has six facets. Because a polygonal shape is used for the first angled mating surface 34, there are corners for the polygonal shape to resist rotation and respective sliding of the first coupling conduit segment 12 in relation to the magnetically coupled second coupling conduit segment 14 when they are coupled together. The first angled mating surface 34 may, in some embodiments, further comprise an annular seal 60, such as a rubber gasket or other seal, located within the first angled mating surface 34, such as embedded or on the annular ring 37 that extends inward from the outer surface 32 to the angled mating surface 34.

The angled mating surface 34 further includes a plurality of magnetic attractors 36 on the plurality of facets of the polygonal shape of the angled mating surface 34. The magnetic attractors 36 may be embedded within the angled mating surface 34 at each of the plurality of facets, or may be at the surface of the angled mating surface 34. A magnetic attractor 36 may be included at each of the facets, or at select facets about the polygonal shape. The magnetic attractors 36 may be actual magnets, such as rare earth magnets, magnetized materials, such as ferromagnetic materials, or materials formed to attract magnets, such as ferromagnetic materials. Those of ordinary skill in the art will understand the range of materials that may be used. In combination with the opposing magnetic attractors 55 on the angled mating surface 54 on the second coupling conduit segment 14, the two angled mating surfaces 34, 54 magnetically couple together. At least one of two corresponding magnetic attractors 36, 55 that match up when the first and second coupling conduit segments 12, 14 are coupled, should be magnetically active to provide attraction to the opposing magnetic attractor, but in some embodiments, both of the corresponding magnetic attractors 36, 55 are magnetically active, and in particular embodiments, both are magnets.

The second coupling conduit segment 14 is configured to couple to a hose 10 coupled to a forced air system. In the particular embodiment illustrated in FIGS. 4B, 4D, 6 and 7, the inner surface of the first end 40 of the second coupling conduit segment 14 is internally threaded 42 to threadedly engage with an outwardly threaded 11 end of the hose 10 (FIGS. 1A-1B).

Figure 5A:
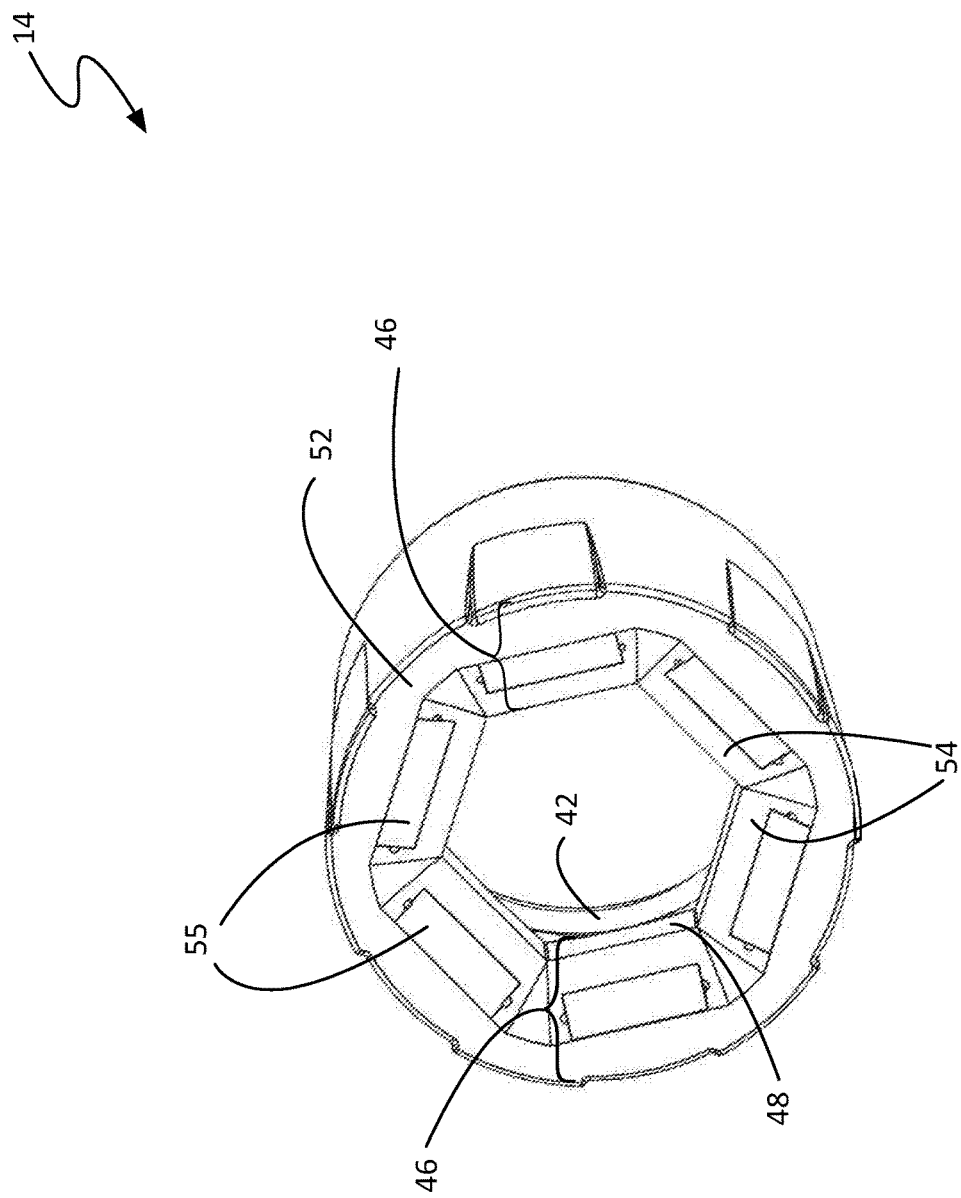
FIG. 5A is a perspective view of the attractors of a hose-end coupling.
Figure 5B:
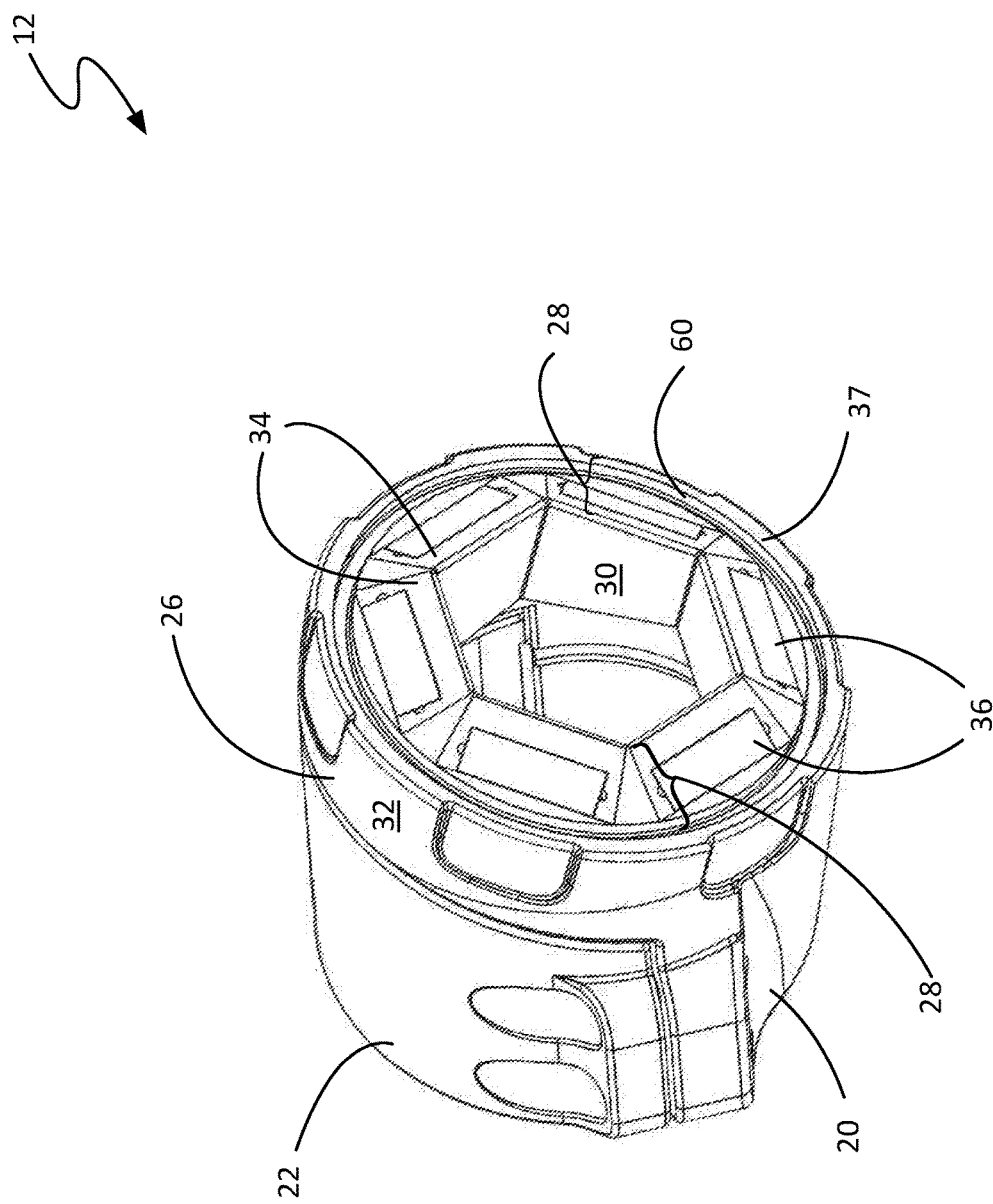
FIG. 5B is a perspective view of the attractors of a barb-end coupling.
Figure 6:
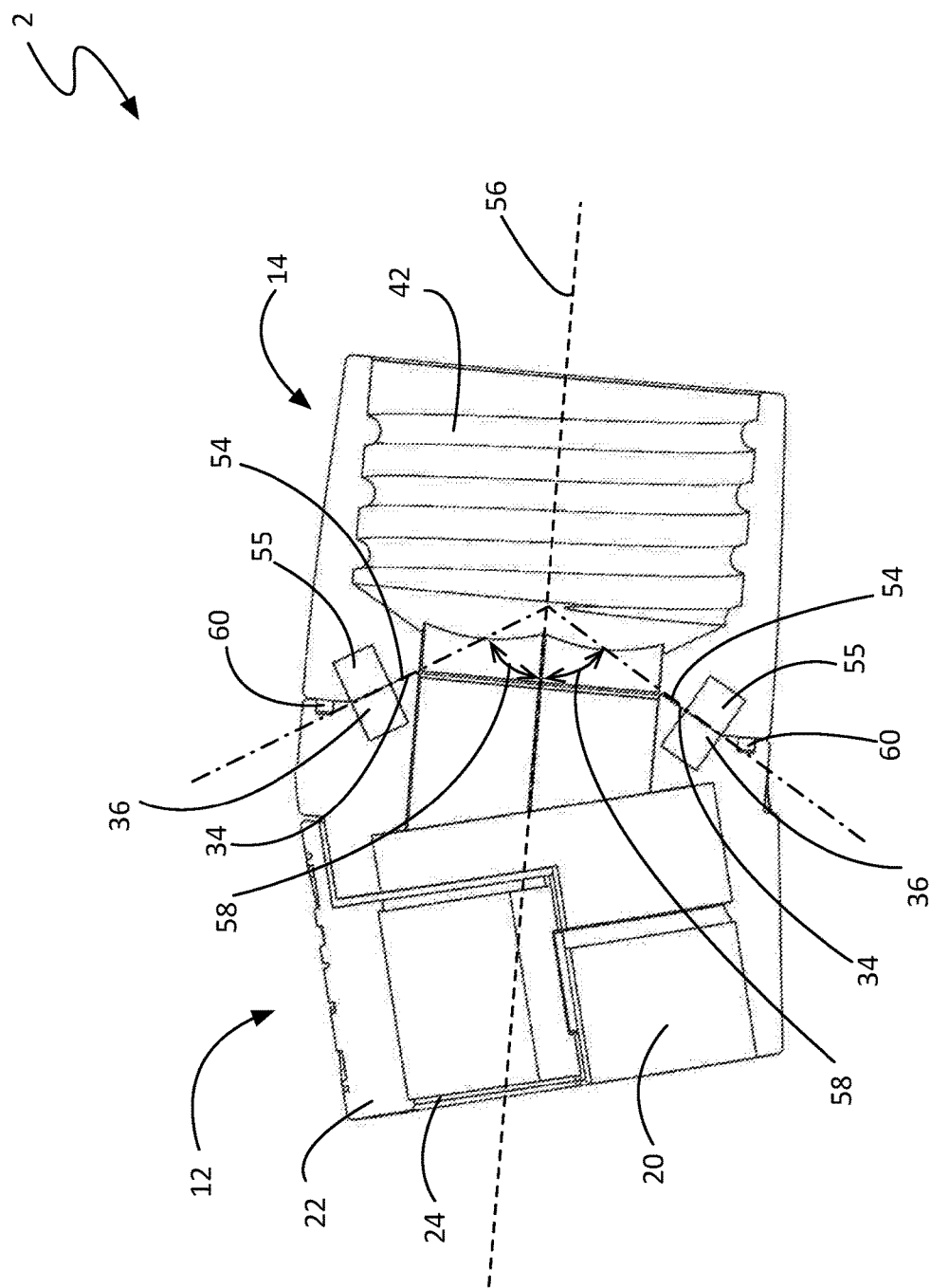
FIG. 6 is a cross-sectional view of the coupled magnetic hose coupling of FIG. 4A taken along cross-section lines B-B.
Figure 7:
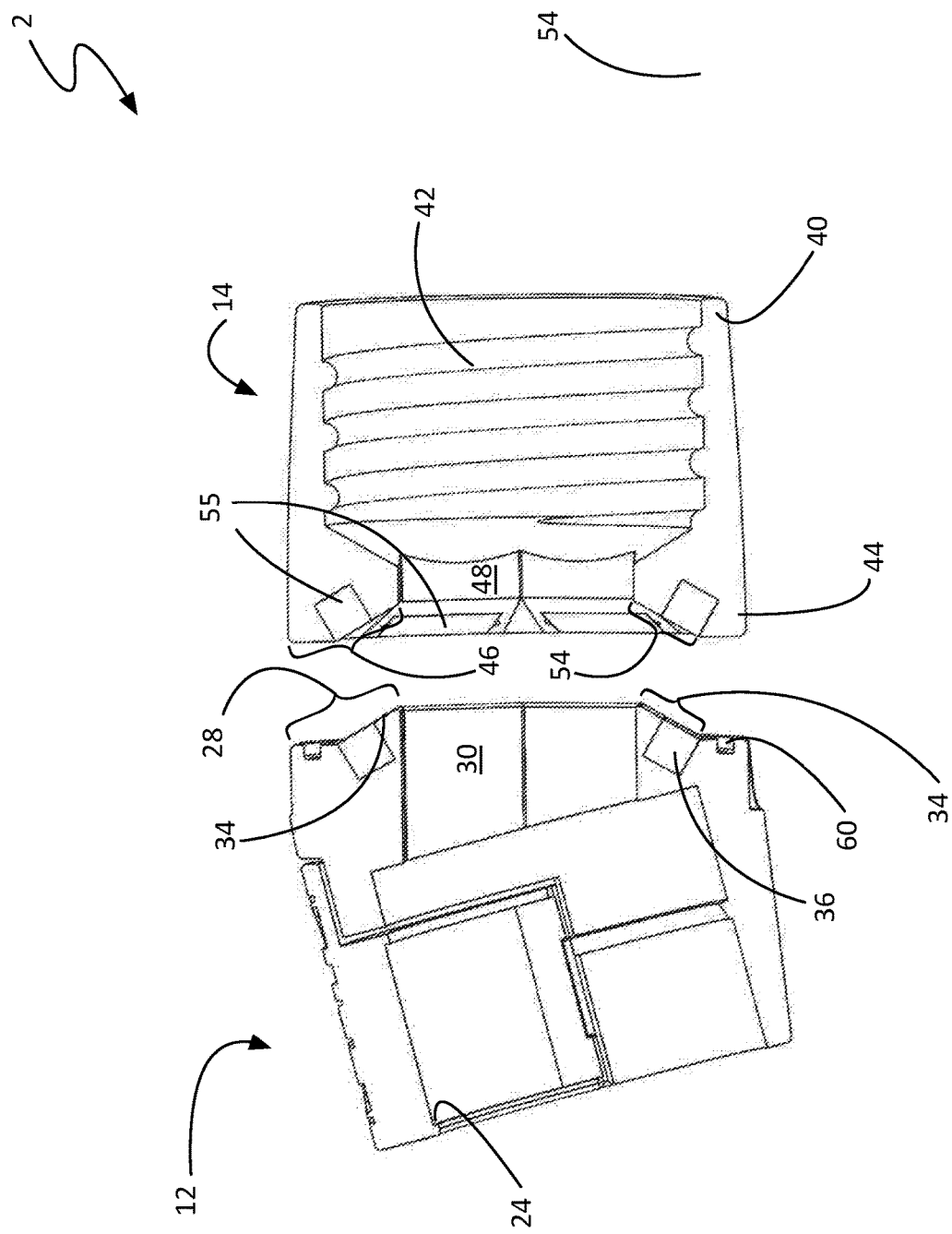
FIG. 7 is a cross-sectional view of the uncoupled magnetic hose coupling of FIG. 2A taken along cross-section lines A-A.

Like the first coupling conduit segment 12, the second coupling conduit segment 14 includes a second end 44 that includes an inner wall or surface 48 and an outer wall or surface 50, with a leading edge 46 extending between them (FIGS. 2B, 5A and 7). The leading edge 46 comprises a second angled mating surface 54, and may comprise an annular ring 52 extending around the second angled mating surface 54. The second angled mating surface 54 of the second coupling conduit segment 14 is angled to compliment the angle of the first angled mating surface 34 of the first coupling conduit segment 12 so that they both are together positioned at an angle 58 (FIG. 6) of 80 degrees or less in relation to the longitudinal axis 56 of the first coupling conduit segment 12 at the second end 26 and will mate when magnetically joined. In particular embodiments, the angle 58 of the second angled mating surface 54 in relation to the longitudinal axis 56 is 70 degrees or less, and in still other embodiments, the angle 58 is 60 degrees or less. In still other embodiments, the angle 58 is between 30 and 80 degrees relative to the longitudinal axis 56. In one particular embodiment, the angle 58 is between 15 and 80 degrees relative to the longitudinal axis 56.

The second angled mating surface 54 is a polygonal shape comprising a plurality of planar facets; or in other words, a second polygonal mating surface 54. The number of planar facets of the polygonal shape of the second angled mating surface 54 depends upon the shape used. For example, the shape may be a triangular shape with three facets, a square shape with four facets, a pentagonal shape with five facets, a hexagonal shape with six facets, a septagonal shape with seven facets, an octagonal shape with eight facets, or any other number of facets. In the embodiment shown in FIG. 2B, the second polygonal mating surface 54 comprises a second hexagonal mating surface because it has six facets. Because a polygonal shape is used for the second angled mating surface 54, there are corners for the polygonal shape to resist rotation and respective sliding of the second coupling conduit segment 14 in relation to the magnetically coupled first coupling conduit segment 12 when they are coupled together. Whether an annular seal is included on the first leading edge 28 or not, the second angled mating surface 54 may, in some embodiments, further comprise an annular seal, such as a rubber gasket or other seal, such as embedded or on the annular ring 52 that extends inward from the outer surface 50 to the second angled mating surface 54.

Like the first coupling conduit segment 12, the second coupling conduit segment 14 angled mating surface 54 further includes a plurality of magnetic attractors 55 on the plurality of facets of the polygonal shape of the angled mating surface 34. The magnetic attractors 36 may be embedded within the angled mating surface 34 at each of the plurality of facets, or may be at the surface of the angled mating surface 34. A magnetic attractor 36 may be included at each of the facets, or at select facets about the polygonal shape. The magnetic attractors 55 may be actual magnets, such as rare earth magnets, magnetized materials, such as ferromagnetic materials, or materials formed to attract magnets, such as ferromagnetic materials. Those of ordinary skill in the art will understand the range of materials that may be used. By both the first and second coupling conduit segments 12, 14 including complimentary angled polygonal mating surfaces 34, 54 with magnetic attractors 36, 55 in the planar faceted surfaces of the polygons, the first and second coupling conduit segments 12, 14 resist rotational movement and provide a more secure magnetic engagement of the two segments 12, 14 than a flat engagement that is angled perpendicular to the longitudinal axis 56, or a round engagement that would permit rotation of the segments relative to each other without disengaging.

The first and second coupling conduit segments may be formed from materials such as plastic, metal, composites, and/or carbon fiber that are typically used for helmet and helmet forced air system connection manufacture and may be formed by injection molding, press forming or other methods of manufacture known in the art. The addition of magnets and the other unique angles and components of the particular embodiments disclosed herein are not beyond the ability of those of ordinary skill in the art given the additional instruction and explanations provided herein. Those of ordinary skill in the art will understand the range of materials that can be used for manufacturing the first and second coupling conduit segments 12, 14 to couple to conventional externally threaded hoses 10 and grooved barbs 6 of a helmet 4 given the disclosure provided herein.

Where the above examples, embodiments and implementations reference examples, it should be understood by those of ordinary skill in the art that other helmets and manufacturing methods and examples could be intermixed or substituted with those provided. In places where the description above refers to particular embodiments of helmets, hoses, coupling segments and customization methods, it should be readily apparent that a number of modifications may be made without departing from the spirit thereof and that these embodiments and implementations may be applied to other to helmet assembly methods as well. Accordingly, the disclosed subject matter is intended to embrace all such alterations, modifications and variations that fall within the spirit and scope of the disclosure and the knowledge of one of ordinary skill in the art.

What is claimed is:

1. A magnetic hose coupling system for a helmet, comprising:
   a first coupling conduit segment configured to magnetically couple to a second coupling conduit segment, the first coupling conduit segment having:
      a first end comprising a hinged clamp having a body, and a clasp hingedly coupled to the body, the first end comprising an internal ridge sized and adapted to receive and engage with a groove on a forced air intake barb on a motorsport helmet when the first end is coupled to the motorsport helmet, the hinged clamp proximate the first end; and
      a second end, distal to the first end, the second end comprising a leading edge extending between inner and outer walls of the first coupling conduit segment, the leading edge comprising a first hexagonal mating surface and an annular ring extending inward at the leading edge from the outer wall, the leading edge further comprising a magnetic attractor at a surface of the first hexagonal mating surface on each of six sides of the first hexagonal mating surface; and
   the second coupling conduit segment having:
      a first end internally threaded and adapted to connect to a forced air hose; and
      a second end, distal to the first end, the second end comprising a leading edge extending between inner and outer walls of the second coupling conduit segment, the leading edge comprising an annular ring extending inward at the leading edge from the outer wall, the leading edge further comprising a second hexagonal mating surface comprising a magnetic attractor at a surface of the second hexagonal mating surface on each of six sides of the second hexagonal mating surface, the second hexagonal mating surface angled to mate with the first hexagonal mating surface of the first coupling conduit segment; and a longitudinal axis centered in both the second end of the first coupling conduit segment and the second end of the second coupling conduit segment;

wherein the magnetic attractors of at least one of the first hexagonal mating surface and the second hexagonal mating surface comprise magnets flush with the respective hexagonal mating surface at which it exists, the first hexagonal mating surface and the second hexagonal mating surface forming an angle with the longitudinal axis that is less than 80 degrees.

2. The magnetic hose coupling system of claim 1, wherein the angle is less than 70 degrees.

3. The magnetic hose coupling system for the helmet of claim 1, wherein the angle is 60 degrees or less.

4. The magnetic hose coupling system of claim 1, wherein the magnetic attractors are each planar facets of the respective hexagonal mating surface at which it exists.

5. The magnetic hose coupling system of claim 1, further comprising a motorsport helmet with a forced air intake barb having at least one groove on an outer surface of the intake barb, wherein the at least one groove is seated against the internal ridge of the first end of the first coupling conduit segment.

6. The magnetic hose coupling system of claim 1, further comprising a seal ring positioned on the leading edge of either the first coupling conduit segment or the second conduit coupling segment that is positioned between the first coupling conduit segment and the second coupling conduit segment when the first hexagonal mating surface is mated with the first hexagonal mating surface.

7. The magnetic hose coupling system of claim 1, wherein at least a portion of one of the first and second hexagonal mating surfaces is inside of the other of the first and second hexagonal mating surfaces when the first coupling conduit segment is magnetically coupled to the second coupling conduit segment.

8. The magnetic hose coupling system of claim 1, wherein the magnetic attractors for both the first and second hexagonal mating surfaces are magnets.

9. A magnetic hose coupling system for a helmet, the magnetic hose coupling system comprising:

a first coupling conduit segment configured to magnetically couple to a second coupling conduit segment, the first coupling conduit segment having:
 a first end adapted to receive a forced air intake barb on a motorsport helmet when the first end is coupled to the motorsport helmet; and
 a second end, distal to the first end, the second end comprising a leading edge between inner and outer walls of the first coupling conduit segment, the leading edge comprising a first polygonal mating surface and a first plurality of magnetic attractors each on different planar facets of the first polygonal mating surface; and the second coupling conduit segment having:
 a first end adapted to connect to a forced air hose; and
 a second end, distal to the first end, the second end comprising a leading edge between inner and outer walls of the second coupling conduit segment, the leading edge comprising a second polygonal mating surface a second plurality of magnetic attractors each on different planar facets of the second polygonal mating surface, the second plurality of magnetic attractors positioned to align with the first plurality of magnetic attractors first polygonal mating surface; and a longitudinal axis centered in both the second end of the first coupling conduit segment and the second end of the second coupling conduit segment;

wherein at least a portion of the plurality of magnetic attractors of at least one of the first polygonal mating surface and the second polygonal mating surface comprise magnets, the first polygonal mating surface and the second polygonal mating surface forming an angle with the longitudinal axis that is 80 degrees or less.

10. The magnetic hose coupling system of claim 9, wherein the first end of the first coupling conduit segment further comprising a clamp hingedly coupled to the first coupling conduit segment, the clamp movable between an open position in which the first coupling conduit segment is open and sized to receive the air intake barb of the helmet, and a closed position in which the first coupling conduit segment is closed.

11. The magnetic hose coupling system of claim 9, the leading edge of each of the first and second coupling conduit segments further comprising an annular ring positioned to mate with each other when the first polygonal mating surface and the second polygonal mating surface are mated.

12. The magnetic hose coupling system of claim 11, further comprising an annular seal positioned between the leading edges of the first and second coupling conduit segments when the first polygonal mating surface and the second polygonal mating surface are mated.

13. The magnetic hose coupling system of claim 9, wherein the first end of the second coupling conduit segment is internally threaded.

14. The magnetic hose coupling system of claim 9, wherein each of the first and second polygonal mating surfaces comprise at least five planar facets.

15. The magnetic hose coupling system of claim 14, wherein each of the first and second polygonal mating surfaces comprises at least six planar facets.

16. The magnetic hose coupling system of claim 9, wherein the angle is 70 degrees or less.

17. The magnetic hose coupling system for the helmet of claim 9, wherein the angle is 60 degrees or less.

18. The magnetic hose coupling system of claim 9, further comprising a motorsport helmet with a forced air intake barb having at least one groove on an outer surface of the intake barb, wherein the at least one groove is seated against an internal notch of the first end of the first coupling conduit segment.

19. The magnetic hose coupling system of claim 9, wherein at least a portion of one of the first and second polygonal mating surfaces is inside of the other of the first and second polygonal mating surfaces when the first coupling conduit segment is magnetically coupled to the second coupling conduit segment.

20. The magnetic hose coupling system of claim 9, wherein the magnetic attractors for both the first and second polygonal mating surfaces are magnets.

* * * * *